United States Patent [19]

Johnson

[11] 3,945,751

[45] Mar. 23, 1976

[54] UNIVERSAL FLOATING TOOL HOLDER

[76] Inventor: Allan S. Johnson, 1400 Nottingham Road, Newport Beach, Calif. 92660

[22] Filed: Sept. 30, 1974

[21] Appl. No.: 510,356

[52] U.S. Cl. ............... 408/127; 10/89 F; 10/139 R; 279/16; 408/139; 408/714
[51] Int. Cl.² .......................................... B23G 3/06
[58] Field of Search ........... 408/139, 142, 714, 127, 408/48; 279/16; 10/89 F, 89 H, 139 R

[56] References Cited
UNITED STATES PATENTS

| | | | |
|---|---|---|---|
| 2,325,184 | 7/1943 | Jampoler | 408/139 |
| 2,574,016 | 11/1951 | Burg | 408/139 X |
| 3,371,364 | 3/1968 | Johnson | 408/142 X |
| 3,553,753 | 1/1971 | Hundley | 279/16 X |

Primary Examiner—Othell M. Simpson
Assistant Examiner—Z. R. Bilinsky
Attorney, Agent, or Firm—Albert M. Herzig; Edward C. Walsh

[57] ABSTRACT

A universal floating tool holder adapted for floatingly holding tools and particularly adapted for holding a tap for a tapping tool. The toolholder embodies telescoping bodies with a clutch in between the two bodies. Also between the telescoping bodies there are provided resilient means preferably in the form of O-rings. Provision is made for a limited amount of relative axial movement or displacement between the two bodies sufficient for clutch disengagemeent. The resilient means between the two bodies allows for relative radial or lateral float or displacement of one body relative to the other. The outer telescoping body holds the tool which may be attached in a chuck.

3 Claims, 5 Drawing Figures

UNIVERSAL FLOATING TOOL HOLDER

BACKGROUND OF THE INVENTION

1. Field of the Invention

The field of the invention is that of tool holders, the invention being particularly adapted as a tap holder. A preferred exemplary form of the invention is described in detail herein adapted as a tap holder for use in tapping operations. The tap holder is driven by a typical type of machine which provides rotary drive combined with axial advance of the tool holder. The exemplary form of the invention is shown herein as a type embodying a releasable clutch.

2. Description of the Prior Art

Various constructions of tool holders are known in the prior art adapted for holding various types of tools, such as taps and drills and reamers, etc., which may be used in different types of machines such as drill presses, screw machines, lathes, etc. Tool holders are known in the art which are particularly adapted for holding a tap in a tapping machine. Among those known tool holders are types that embody torque release clutches adapted to release the rotary drive in the tool and respond to a predetermined torque load. Reference is made to U.S. Pat. Nos. 1,974,345; 2,369,751; 2,580,937; 2,764,416; 2,848,239; 2,848,239; 2,881,454; and 3,214,773. The tool holder of the herein invention embodies specific improvements not present in or known to the prior art as set forth more in detail hereinafter.

SUMMARY OF THE INVENTION

The invention is an improved tool holder which as set forth in the foregoing abstract embodies the capability of providing for lateral or radial float. Typically, in tool holders, there are provided parts or bodies between which there is provided limited relative axial movement, one of the bodies including a chuck which carries the tool. Typically, also, tool holders as known may embody a torque release clutch within the tool holder capable of releasing the rotary drive when the tool encounters a predetermined torque load.

The exemplary form of the tool holder as described in detail herein is described as adapted for utilization for holding a tap utilizable in a tapping machine. In the exemplary form of the invention as set forth in the abstract, there are two bodies having telescoping parts with provision for a limited amount of relative axial movement as between the parts. One part includes the chuck which holds the tool which in the particular case described is a tap. In addition to the provision for limited relative axial movement, the holder of the invention embodies means interposed between the telescoping parts and providing for a limited amount of lateral, that is radial float. In the preferred form of the invention, the resilient means takes the form of a pair of O-rings fitting into annular grooves having positions such that the O-rings are in between the telescoping parts. The relative axial movement is limited by a flange on one of the bodies which forms a stop.

The construction as just described has a number of advantages and achieves certain specific objectives as follows: At times tapping is done into a number of previously drilled holes. Difficulty may be encountered in attempting to line up the spindle of the tapping machine with a hole, the alignment not being perfect but rather a few thousandths of an inch off. The capability of the herein holder to float laterally or radially thus enables the chuck holding the tap to move radially or laterally sufficiently to exactly center itself in the hole to be tapped even though the axis of the spindle is not exactly centered. It is a primary object of the invention to realize this characteristic or capability in the tool. As may readily be observed, this capability is of advantage irrespective of the type of machine that is driving the tool and the advantage is present whether the tool is operated in horizontal or vertical position.

A further object is to realize the additional capability in a tool holder as described of providing for release of the rotary drive in response to predetermined relative axial movement of the parts.

A further object is to realize a tool holder having the characteristics set forth which additionally is smaller, cheaper and more economical and more adaptable to uses in situations where there is not enough room for a larger or longer tool holder.

Further objects and advantages of the invention will become apparent from the following detailed description and annexed drawings wherein.

DESCRIPTION OF THE PREFERRED EMBODIMENT

Figure 1:
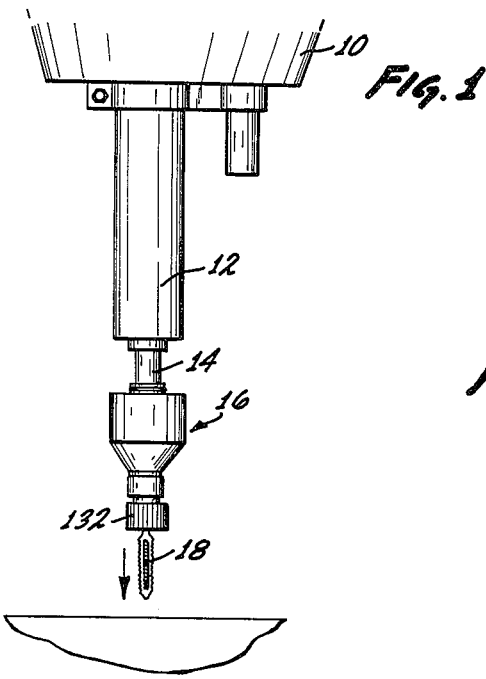
FIG. 1 is partial schematic view of a machine carrying the tool holder and tap engaged in the tool holder.

Referring to FIG. 1 of the drawings numeral 10 designates part of a machine adapted for driving a tapping tool. It has an extending stem 12 from which extends a spindle 14 which imparts rotary drive to the tap. The tap holder of the invention is designated generally at 16, the tap itself being designated at 18.

Figure 2:
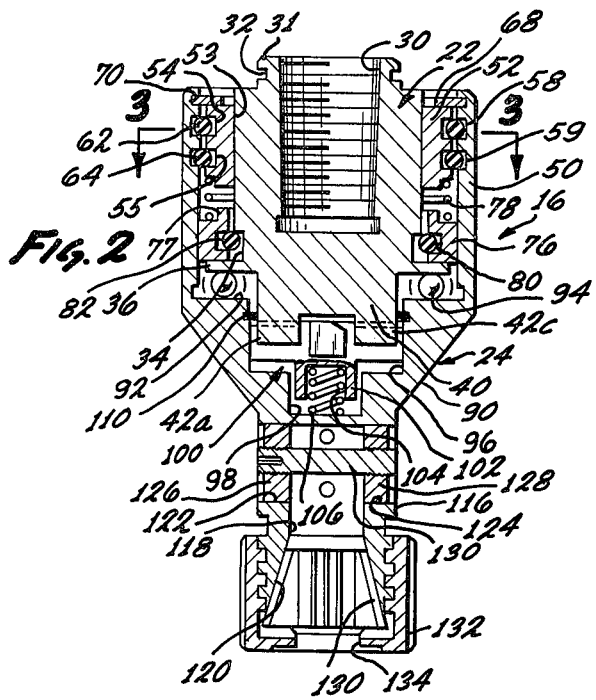
FIG. 2 is a cross-sectional view of the tool holder of FIG. 1.
Figure 3:
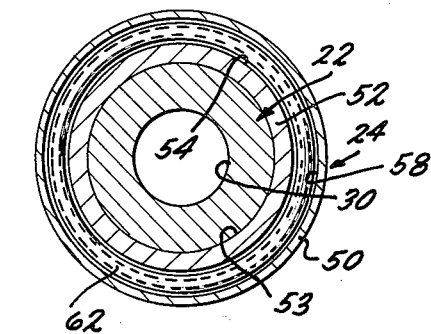
FIG. 3 is a sectional view taken along the line 3—3 of FIG. 2.
Figure 5:
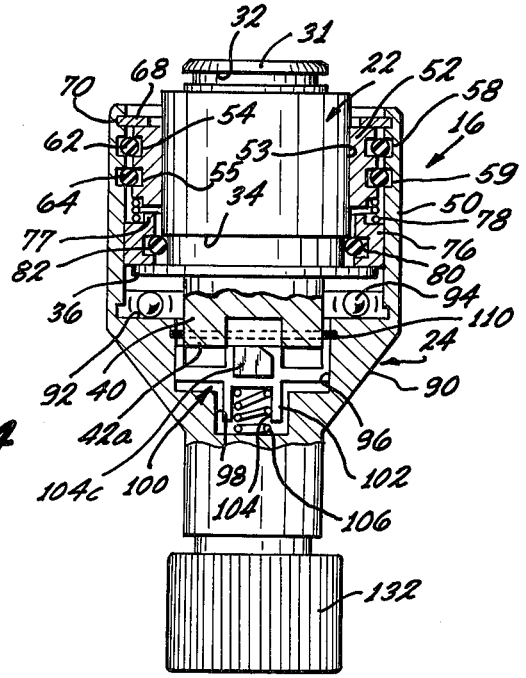
FIG. 5 is a sectional view similar to that of FIG. 2 showing the position of the parts with the clutch in disengaged position.

FIGS. 2 and 5 show the tap holder in cross-section. The tap holder comprises a first cylindrical body 22 and a second cylindrical body 24. The first body 22 has a threaded bore 30 adapted to have the end of the spindle 14 threaded into it. It has an extending neck part 31 in which is an annular groove 32.

Figure 4:
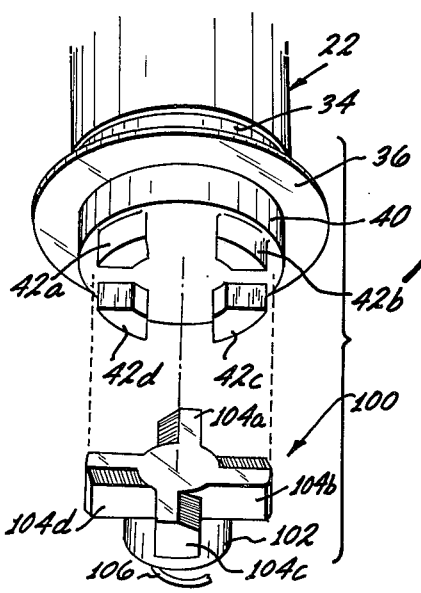
FIG. 4 is an exploded perspective view of the clutch mechanism embodied in the tool holder.

Near the lower end of the body 22 it has an annular groove 34 and an extending flange 36 which will be referred to again presently. Its lower part as designated at 40 is of smaller diameter and it carries projections forming one part of a releasable clutch. Extending from the part 40 are the lug members 42a, 42b, 42c and 42d. See FIG. 4. As may be seen, the lug members have tapering sides and their inner and outer surfaces are arcuate. The spaces between adjacent lug members form radial slots. The clutch mechanism will be referred to more in detail presently.

The second body part 24 is cylindrical at the upper part as designated by the numeral 50 and the first body part 22 is telescoped within the part 50. Numeral 52 designates a bushing having a bore 53, the bushing being fitted around the body 22. Bushing 52 has two annular grooves in it 54 and 55. Opposite the annular grooves 54 and 55 are annular grooves 58 and 59 formed in the inside of the upper part 50 of the second body 24. Interposed in the pairs of annular grooves are O-rings 62 and 64 which may preferably be made of rubber and are flexible or resilient and thereby allowing a limited amount of lateral or radial float or displacement of the body 24 relative to the body 22. Body 24 may move axially relative to the body 22 as will be described more in detail presently.

Numeral 68 designated a snap ring which fits into an annular groove 70 on the inside of the upper part of the second body 24 which retains the parts in assembled relationship.

Numeral 76 designates a bushing which is within the upper portion 50 of part 24. It has an upper part 77 of smaller diameter which forms a spring retainer 78. It has an annular groove 80 which is opposite the annular groove 34 in the body 22 and positioned in the groove is an O-ring 82. Spring 78 acts on the bushings 52 and 76, the lower end of bushing 52 forming a retainer for the upper end of the spring.

The lower part of the body 24 tapers inwardly as designated at 90 and at the lower part of the upper portion 50 is a flat radial surface as designated at 92. Interposed between this surface and the flange 36 is thrust bearing in the form of a circular ball race having balls in it as designated at 94.

Within the lower part 90 of the body 24 is a bore 96 and a counter bore 98. The lower part 40 of the body 22 extends into the bore 96. Numeral 100 designates a lower clutch member as shown in detail in FIG. 4. Its lower part 102 is cylindrical and this part has a bore 104. Received in the bore is a biasing spring 106 which rests on the bottom of the counter bore 98 and urges the clutch member 100 upwardly. The upper part of the clutch member 100 has four extending spokes 104a, b, c and d. These spokes or clutch members are generally rectilinear in cross-section, each spoke having a front bevelled edge or surface as designated at 106 in FIG. 4 for the spoke 104c. The spokes 104 extend into the radial slots in between the lugs 42 on the upper clutch member 40.

Numeral 110 designates an O-ring in an annular groove in the bore 96 and positioned between this bore and the part 40 of the body 24.

The lower part of body 24 carries the tap holding chuck. It is in the form of an extending stem 116 having a bore 118 and a tapered counter bore 120. In the sides of the bore 118 are rectangular openings 122 and 124 and received in these openings are jaws 126 128 which may be drawn together by stem 130, the ends of which are threaded, numbers 126 and 128 forming back jaws. Within the tapered bore 120 are collet members as designated at 130, the outside of the stem being threaded as shown to receive chuck nut 132 which has an end bore 134 and which is operable in a known manner to retain the tap 18 in the chuck.

OPERATION

FIG. 2 shows the tap holder in the position it would occupy in normal operation. As may be observed, the body 22 is in a position determined by the stem 14 onto which it is threaded. The body 50 which carries the tap chuck is able to float or be displaced laterally or radially a limited amount relative to the body 22 and this makes it possible to exactly align the tap with the previously drilled hole even if the spindle 12 is off alignment a small amount, such as a few thousandths of an inch.

FIG. 2 shows the normal position when the clutch within the tap holder is in engagement so that the machine transmits rotary drive to the tap while it is being advanced. During operation, as the tool holder is being advanced and the tap is also advancing into the hole, the body 24 moves axially relative to the body 22 into a position as illustrated in FIG. 5. From this it may be seen that the body 50 and the bushing 52 have moved axially relatively compressing the biasing spring 78 and the bushing 76 being against the flange 36 which serves as a stop. In the position of FIG. 2, the thrust bearing 94 is between the flat surface 92 and the flange 36. In the position of FIG. 5, the thrust bearing has moved downwardly relative to the flange 36. In the position of FIG. 5, the lower clutch member 100 has moved downwardly away from the upper clutch member so that the lugs 42 are able to ride against the flat or bevelled surfaces 106 on the spokes 104 so that the clutch member 100 is moved downwardly against the spring 106, the parts thus disengaging and no longer transmitting rotary motion to the tap. Upon reverse rotary motion being imparted to the tap holder, the lugs 42 on the upper clutch member can engage the flat sides of the spokes 104 that do not have the bevels and the tap can be backed out of the tapped hole.

From the foregoing, those skilled in the art will readily understand the nature and construction of the invention and the manner in which it achieves and realizes all of the objectives as set forth in the foregoing.

The foregoing disclosure is representative of a preferred form of the invention and is to be interpreted in an illustrative rather than a limiting sense. The invention to be accorded the full scope of the claims appended hereto.

I claim:
1. A tool holder adapted to being carried by a machine and to hold a tool, comprising in combination a first body having means for attachment to a machine; a second body carrying a tool chuck, the first body and the second body being axially aligned and having parts in telescoping relationship;
means for transmitting rotary drive from the first body to the second body;
means interposed between the telescoping parts, providing for relative axial movement between the bodies and for limited lateral float of the second body relative to the first body where said interposed means between the telescoping parts includes resilient members having compressibility to allow for lateral float and where said interposed means comprises O-ring means positioned between the first body and the second body, whereby to allow the second body to float radially relative to the first body a limited amount; and
a bushing surrounding the first body having an annular groove, said second body having a juxtaposed annular groove, said O-ring means being held in said grooves and said bushing being axially movable relative to the first body.
2. A device as in claim 1 including a second bushing surrounding said first body, spring means interposed between the bushings and resilient means positioned to allow said second bushing to float radially.
3. A device as in claim 2 wherein said last resilient means comprises an O-ring.

* * * * *